United States Patent Office.

CHARLES A. GRANDEY, OF RUTLAND, VERMONT.

Letters Patent No. 71,296, dated November 26, 1867.

IMPROVED LUBRICATING COMPOSITION.

The Schedule referred to in these Letters Patent and making part of the same.

TO ALL WHOM IT MAY CONCERN:

Be it known that I, CHARLES A. GRANDEY, of Rutland, in the county of Rutland, and State of Vermont, have invented or compounded a new and improved Railway-Lubricator, to be used for journals of all kinds; and I do declare the following is a full and exact description thereof, reference being had to the accompanying specimens or component parts, and to the letters of reference marked thereon.

The nature of my discovery or invention is the combinations of certain chemical agents to form a lubricator which will not waste away or evaporate while the journals upon which it has been applied are at rest, and which is cheaper in cost and more durable in its use than any lubricator known.

To enable others skilled in the art to make and use my invention or composition, I will proceed to describe its constituent combinations. The following is an exact description of the articles used and their proportions:

A, one gallon tallow heated to the boiling point; B, one gallon cold soft soap intermixed and stirred with the heated tallow till it cools to 120° Fahrenheit. Then add, intermix, and stir in one-half ounce lac sulphur, C; one-quarter ounce alum, D; one-quarter ounce antimony, E; the whole mass to be stirred till cool. For use upon railways in a hot climate, add a greater proportion of sulphur, and in a cold climate add less. For packing railway-journals, use wool instead of cotton-waste.

What I claim as my invention, and desire to secure by Letters Patent, is—

The combination of tallow, soft soap, sulphur, antimony, and alum, in the proportions or their equivalent set forth, and using it as a lubricator for journals.

CHAS. A. GRANDEY.

Witnesses:
 HENRY H. SMITH,
 MARTIN M. CROOKER.